US006874737B1

(12) United States Patent
Madelone

(10) Patent No.: US 6,874,737 B1
(45) Date of Patent: Apr. 5, 2005

(54) UNIVERSAL FIXTURE SYSTEM AND BASE THEREFOR

(76) Inventor: Thomas Madelone, 80 Marra La., Schenectady, NY (US) 12303

( * ) Notice: Subject to any disclaimer, the term of this patent is extended or adjusted under 35 U.S.C. 154(b) by 0 days.

(21) Appl. No.: 09/368,011

(22) Filed: Aug. 3, 1999

(51) Int. Cl.[7] .............................................. A45D 19/04
(52) U.S. Cl. .................... 248/127; 248/126; 248/274.1; 248/276.1; 269/37; 269/55; 269/71; 269/74
(58) Field of Search ........................ 248/200.1, 177.1, 248/906, 124.1, 126, 127, 284.1, 274.1, 276.1, 185.1; 269/37, 55, 71, 74, 45, 65, 104

(56) References Cited

U.S. PATENT DOCUMENTS

| 260,396 | A | * | 7/1882 | Hunt | 269/37 |
|---|---|---|---|---|---|
| 288,035 | A | * | 11/1883 | Dixon | 269/37 |
| 837,957 | A | * | 12/1906 | Perry | 269/37 |
| 954,961 | A | * | 4/1910 | Higham et al. | 269/37 |
| 1,084,130 | A | * | 1/1914 | Cargin | 269/37 |
| 1,670,253 | A | | 5/1928 | Gilbert et al. | |
| 2,669,958 | A | * | 2/1954 | Sweeney | 269/37 |
| 2,708,540 | A | * | 5/1955 | Cook et al. | 226/46.1 |
| 3,357,663 | A | * | 12/1967 | Ivy | 248/43 |
| 3,518,421 | A | * | 6/1970 | Cogdill | 248/57 |
| 3,883,128 | A | | 5/1975 | Breese | 269/45 |
| 4,057,164 | A | * | 11/1977 | Maier | 220/3.6 |
| 4,125,251 | A | | 11/1978 | Jamieson, Jr. | 269/45 |
| 4,253,649 | A | | 3/1981 | Hewson | 269/45 |
| 4,258,908 | A | | 3/1981 | Goff et al. | 269/239 |
| 4,500,077 | A | | 2/1985 | Coxon | 269/45 |
| 4,538,786 | A | * | 9/1985 | Manning | 248/544 |
| 4,909,405 | A | * | 3/1990 | Kerr, Jr. | 220/3.9 |
| 5,593,115 | A | * | 1/1997 | Lewis | 248/68.1 |
| 6,098,945 | A | * | 8/2000 | Korcz | 248/343 |
| 6,168,126 | B1 | * | 1/2001 | Stafford | 248/276.1 |

* cited by examiner

*Primary Examiner*—Kimberly Wood
(74) *Attorney, Agent, or Firm*—Ronald A. D'Alessandro; Hoffman, Warnick & D'Alessandro LLC

(57) ABSTRACT

A universal fixture system and base therefor is provided that is capable of holding multiple tools and/or workpieces in various positions about a rotational axis. In addition, the fixture system and base allows for single segments or portions to be adjusted independent of the other segments. The fixture system and base include: (1) a base having at least one set of support brackets; (2) a support member, having a shaft and a coupling joined thereto, adapted for connection to one set of support brackets; (3) a connector extending through one set of support brackets and the shaft; and (4) a rod having a first end that is coupled to the coupling.

12 Claims, 9 Drawing Sheets

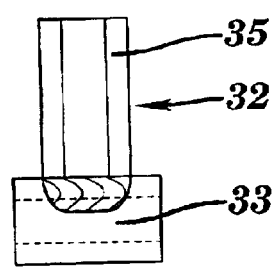
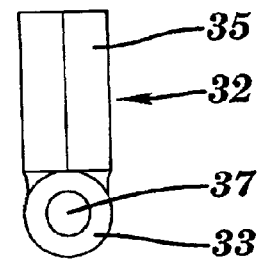
FIG. 4A  FIG. 4B
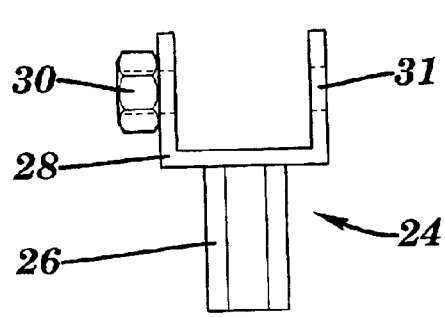
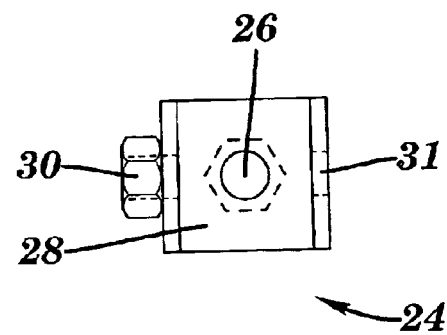
FIG. 5A  FIG. 5B

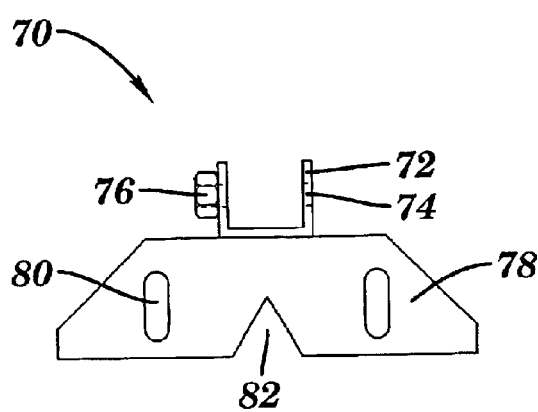
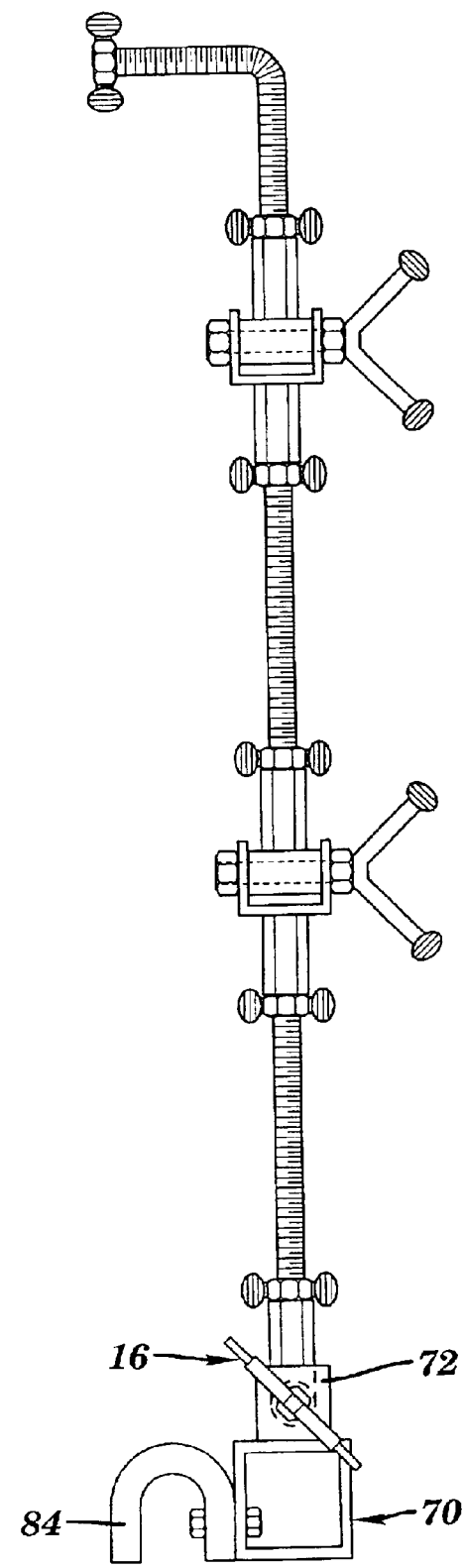
*FIG. 8*     *FIG. 9*

UNIVERSAL FIXTURE SYSTEM AND BASE THEREFOR

BACKGROUND OF THE INVENTION

1. Technical Field

The present invention generally relates to a universal fixture system and base therefor, and more particularly to a fixture system and base that includes separately adjustable segments and is adapted to hold multiple tools and/or workpieces.

2. Background Art

In the use and manipulation of tools, it is often necessary for a workpiece or tool to be secured in a particular position while leaving the hands of a user free. For example, when a user is repairing a workpiece, the workpiece may need to be secured in a vice or similar retaining mechanism. In addition, tools such as drills, screwdrivers, clamps, or flashlights may need to be held or placed in specific positions relative to the workpiece. With such needs, the hands of a user are not free to repair the workpiece, instead, being consumed when the user has to hold the workpiece or tools. Moreover, a user may need to adjust portions or segments of the fixture system without effecting the other segments.

Heretofore, many have attempted to solve such problems by employing inferior variations. Examples include the following, all of which are herein incorporated by reference:

U.S. Pat. No. 1,670,253 to A. Gilbert et al.;

U.S. Pat. No. 3,883,128 to Breese;

U.S. Pat. No. 4,125,251 to Jamieson, Jr.;

U.S. Pat. No. 4,253,649 to Hewson;

U.S. Pat. No. 4,258,908 to Goff et al. and

U.S. Pat. No. 4,500,077 to Coxon.

U.S. Pat. No. 4,253,649 to Hewson teaches an adjustable positioning tool that includes a series of components. With the invention of Hewson, however, when a user attempts to re-position one shaft segment, the preceding shaft segment will also be re-positioned. This will cause the tool or workpiece, disposed adjacent the preceding shaft segment, to also be re-positioned. In addition, Hewson fails to teach a base, or similar structure, onto which the positioning tool can be mounted so that multiple tools and a workpiece can be simultaneously held without requiring the user's hands.

U.S. Pat. No. 1,670,253 to A. Gilbert et al. discloses a welding structure for holding workpieces in place as they are welded together. Similar to Hewson, Gilbert et al. utilizes a system of rods and clamps for securing the workpieces in place. However, the device of Gilbert et al. requires adjustment of multiple fasteners to provide for the vertical positioning of a workpiece. Such a feature is both time consuming and tedious for a user. In addition, the device Gilbert et al. is designed to hold workpieces in planar alignment with each other for welding. This is such that a user is denied the ability to position the workpieces at various positions about a rotational axis.

U.S. Pat. No. 4,500,077 to Coxon discloses a device for clamping that comprises a components. However, similar to the above-discussed references, the adjustment of one rod segment of Coxon requires adjustment of multiple fasteners and potentially, other rod segments.

Therefore, there exists the need for a fixture system, and base therefor, that is adjustable by a user so as to hold multiple tools and/or workpieces in varying positions about a rotational axis. In addition, there exists the need for such a fixture system and base to be adjustable by a user such that one segment or portion of the fixture system can be adjusted without effecting other segments or portions.

SUMMARY OF THE INVENTION

The present invention overcomes the deficiencies of the related art by including a universal fixture system and base that is capable of holding multiple tools and/or workpieces in various positions about a rotational axis. In addition, the present invention overcomes the deficiencies of the related art by providing a fixture system in which single segments or portions are adjustable independent of the other segments.

According to one aspect of the present invention, a fixture system is provided, which includes: (1) a base having at least one set of support brackets and an aperture; (2) a first support member adapted for connection to one set of support brackets, wherein the support member includes a shaft having a coupling joined thereto; (3) a first connector, extending through one set of support brackets and the shaft, for securing the support member to the one set of support brackets; and (4) a rod having a first end and a second end, wherein the first end is coupled to the coupling.

According to a second aspect of the present invention, a fixture system is provided, which includes: (1) a first rod having a first end and a second end; (2) a housing having a channel and a housing coupling, wherein the second end of the first rod is coupled to the housing coupling; (3) a first support member having a shaft and a coupling, wherein the shaft is coupled to the channel of the housing; and (4) a second rod having a first end and a second end, wherein the first end of the 20 second rod is coupled to the coupling of the support member.

According to a third aspect of the present invention, a fixture system is provided, which includes: (1) a clamp; (2) a rod having a first end and a second end, wherein the first end is coupled to the clamp; (3) a housing having a channel and a housing coupling, wherein the second end of the rod is coupled to the housing coupling; (4) a support member having a shaft and a coupling, wherein the shaft of the support member is coupled to with the channel of the housing; and (5) a second rod having a first end and a second end, wherein the first end of the second rod is coupled to the coupling of the support member.

According to a fourth aspect of the present invention, a base is provided, which includes: (1) an elongate body having a first end and a second end; (2) a first set of support brackets positioned adjacent the first end and a second set of support brackets positioned adjacent the second end, wherein each set of support brackets includes a thru-hole and a fastener; and (3) a threaded aperture, positioned between the first and second ends of the base.

According to a fifth aspect of the present invention, a fixture system is provided, which includes: (1) a housing having a channel and a housing coupling; and (2) a support member having a shaft and a coupling, wherein the support member is adapted to couple to the housing.

It is therefore an advantage of the present invention to provide fixture system and base therefor for holding multiple tools and/or workpieces in various positions about a rotational axis. It is also and advantage of the present invention to provide a fixture system and base therefor in which unitary segments of the fixture system are adjustable without effecting other segments.

The preferred embodiment of the invention is designed to solve the problems herein described and other problems not discussed, which are discoverable by a skilled artisan.

BRIEF DESCRIPTION OF THE DRAWINGS

These and other features and advantages of this invention will be more readily understood from the following detailed description of the various aspects of the invention taken in conjunction with the accompanying drawings in which:

FIG. 4A is front view of a support member, in accordance with the present invention;

FIG. 4B is a right side view of the support member of FIG. 4A, in accordance with the present invention;

FIG. 5A is a front view of a housing, in accordance with the present invention;

FIG. 5B is a right side view of the housing of FIG. 5A, in accordance with the present invention;

FIG. 8 is a front view of a magnetic base, in accordance with the present invention;

FIG. 9 is a side view of a fixture system with the magnetic base of FIG. 8, in accordance with the present invention;

Figure 1:
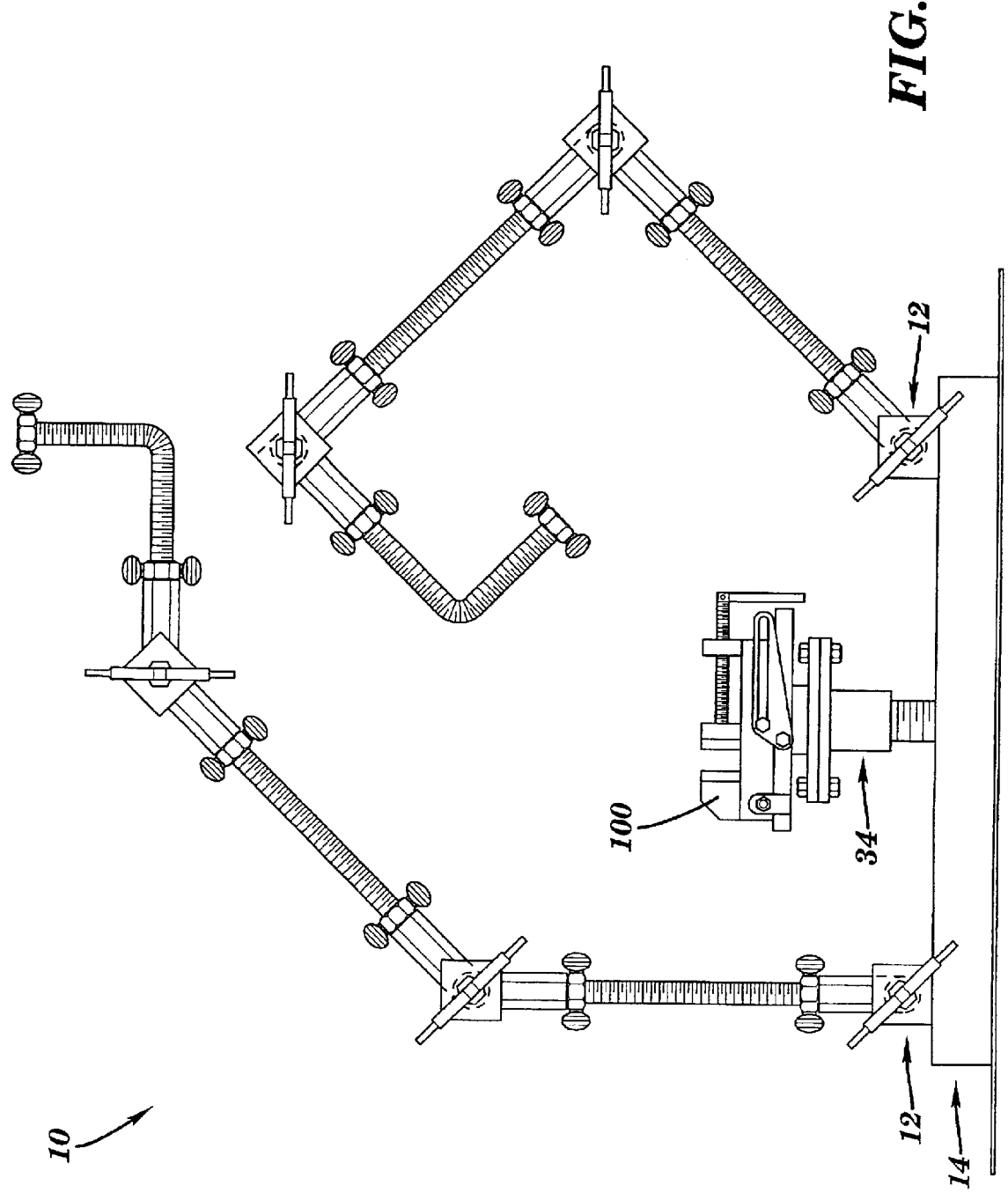
FIG. 1 is a perspective view of a fixture system and base in accordance with the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements between the drawings.

DETAILED DESCRIPTION OF THE DRAWINGS

Figure 2:
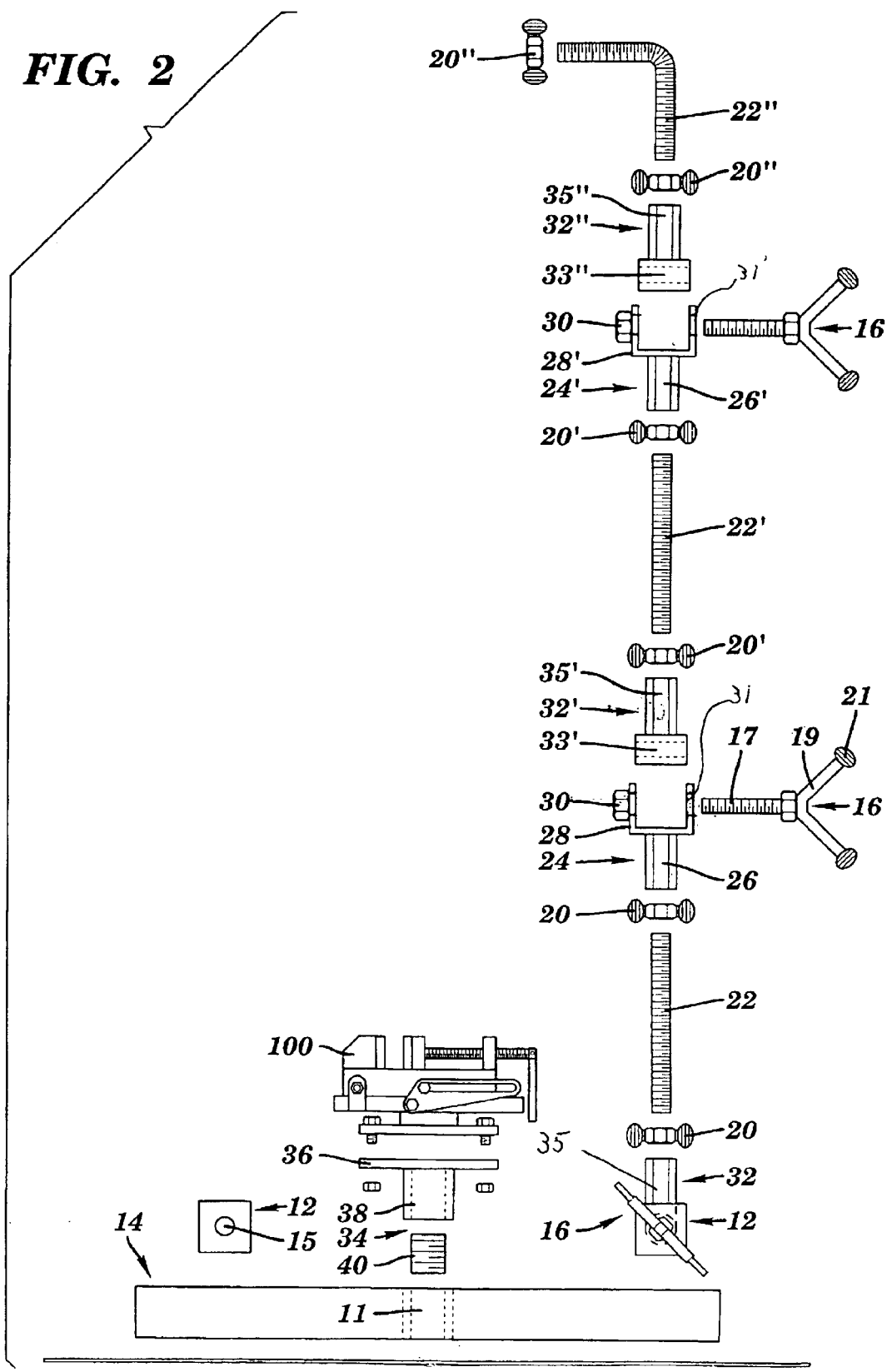
FIG. 2 is an exploded view of the components of the fixture system, in accordance with the present invention.
Figure 3A:
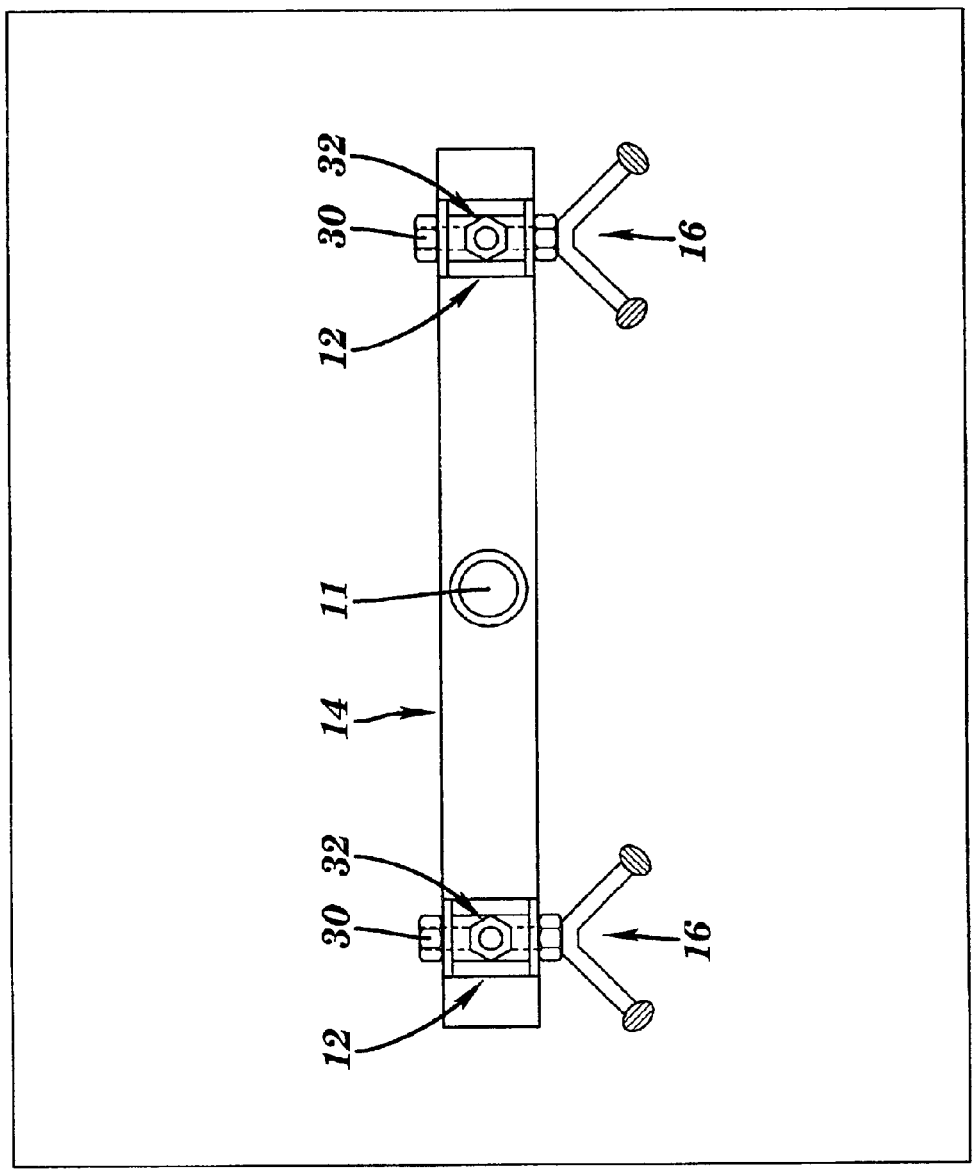
FIG. 3A is a top view of a base, in accordance with the present invention.

Referring now to the drawings, FIG. 1 shows the assembled fixture system 10 and FIG. 2 shows the various components thereof. Referring to FIG. 2, base 14 generally includes opposing sets of support brackets 12 each having a thru-hole 15, and an aperture 11. Aperture 11 is preferably threaded and extends completely through the base 14. In addition, as shown in FIG. 3A, a nut, fastener, or similar fastening device 30 is disposed on each set of support brackets 12 opposite the thru-hole 15. Preferably, the nut 30 is welded onto each set of support brackets 12, however, it should be understood that other equivalent mechanisms of affixing the nut 30 to the support brackets 12 exist.

Next, a support member 32 is shown in detail in FIGS. 4 and 4A. Generally, support member 32 is comprised of a shaft 33 having a thru-hole 37 and a coupling 35 joined thereto. Preferably, the coupling 35 is threaded and is welded to the shaft 33. However, it should be understood that many mechanisms of achieving attachment of the shaft 33 to the coupling 35 could be implemented.

Shown in detail in FIGS. 5A and 5B is a housing 24. Housing 24 includes a channel 28, a housing coupling 26 joined to the channel 28, a nut or fastener 30 affixed to the channel 28, and a thru-hole 31 disposed through a side of the channel 28 opposite the nut or fastener 30. Similar to the coupling 35 of the support member 32, the housing coupling 26 is internally threaded. Moreover, both the nut 30 and the housing coupling 26 are preferably welded to the channel 28. However, similar to the above components, it should be appreciated that many equivalent mechanisms of affixing the nut 30 and housing coupling 26 exist.

Shown in FIG. 2 is a rod 22, wing nut 20, and a handle or connector 16. Rod 22 is preferably externally threaded so as to couple to or engage the couplings 26 and 35 of the housing 24 and support member 32, respectively. In addition, wing nuts 20 are dimensioned to thread onto the rod 22 and to more firmly secure the rod 22 into the couplings 26 and 35. Connector or handle 16 includes a pair of flared handles 19 having flat portions 21 disposed on the ends thereof, and a threaded portion 17 for engaging the thru-hole 31 of the housing 24, the shaft 33 of the support member 32 and then securing into the nut or fastener 30, as will be described in further detail below. The configuration of the handle 16 is advantageous because, inter alia, the flared handles 19 allow a user to generate increased torque in tightening or loosening the handle 16. In addition, the flat portions 21 provide a user with additional leverage and surface area with which they can grip the handle 16. Thus, resulting in more efficient use of the handle 16.

Figure 3B:
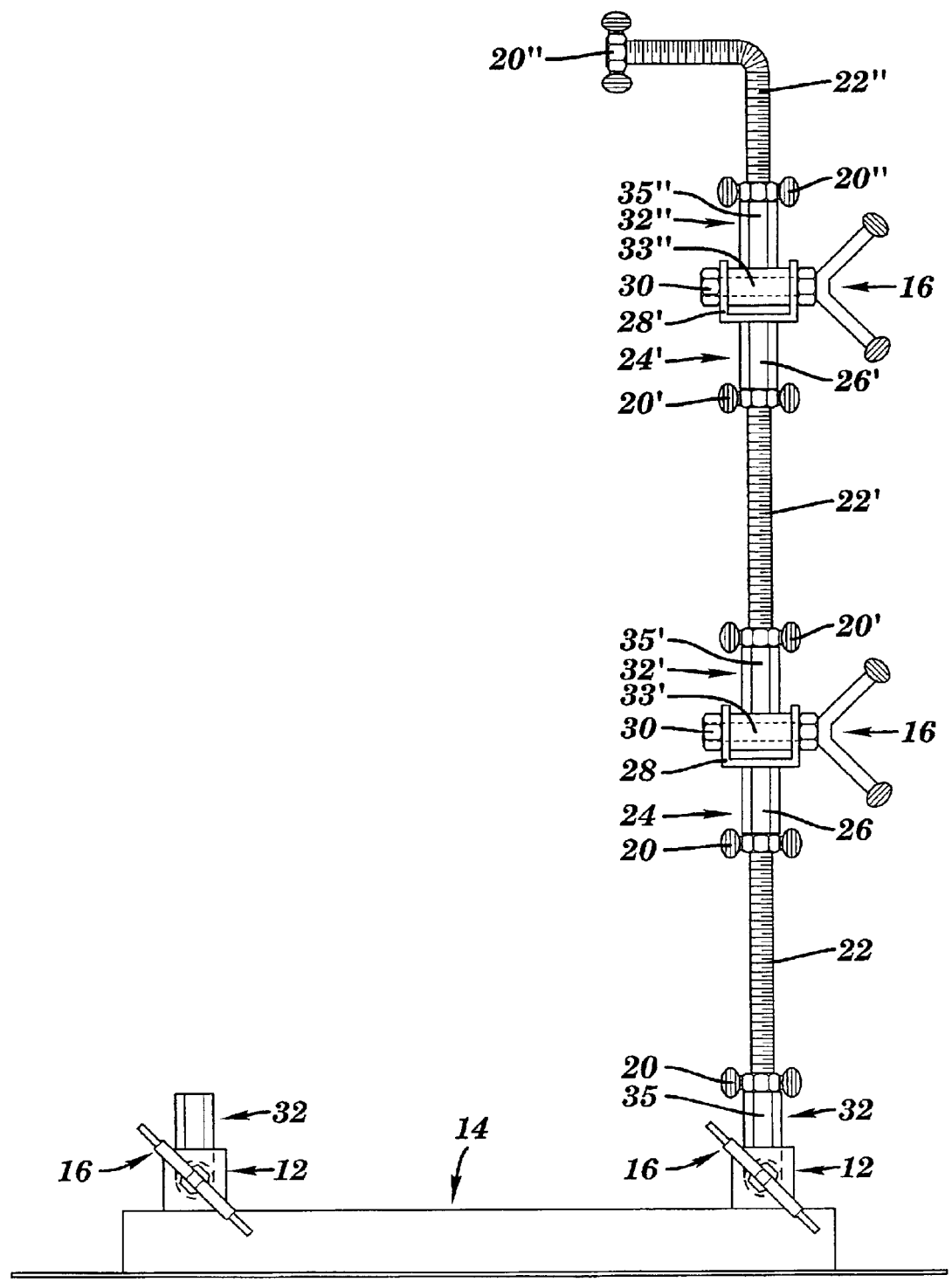
FIG. 3B is a front view of the fixture system and base, in accordance with the present invention.

To use the fixture system 10 a user will assemble the various components as shown in FIGS. 2 and 3B. First, the base 14 is provided. Into each set of support brackets 12, a user will insert a support member 32. Specifically, the support member is inserted with the shaft 33 of the support member being lined-up with the thru-hole 15 and nut 30 of the set of support brackets 12 and the coupling 35 extending vertically away from the set of support brackets 12. This will allow a user to insert a handle or connector 16 into the thru-hole 15 of each set of support brackets 12 so that the threaded portion 17 is placed through the thru-hole 37 of the shaft 33 and then threadedly secured into the nut 30. Thus, locking the support member 32 into place within the set of support brackets 12. In addition, although the coupling 35 of the support member 32 is shown in FIG. 3B as being substantially upright or vertical, it should be appreciated that the described system of inter-fitting the components allows for a user to position the coupling 35 at various positions along a radius. For example, the coupling 35 could be secured into position at any angle within horizontal borders of the base 14. Preferably, each support bracket in the sets of support brackets 12 is approximately 1½" in width×1½" in height with the thru-hole being approximately ½"in diameter. Moreover the shaft 33 of the support member 32 is preferably 1½" in length with a ½" diameter thru-hole. These dimensions will allow for the support member 32 to fit snugly within the set of support brackets 12. With respect to the handle 16, the threaded portion 11 thereof is preferably approximately ½"–13 and the flared handles 19 provide approximately 2" of grip length. These dimensions will allow a user to thread the handle 16 into the nut 30 affixed to the set of support brackets 12, which is preferably a ½–13 nut.

Once the shaft 33 of the support member 32 is secured in the desired position, a rod 22 is then threaded into the coupling 35 of the support member 32. Since the coupling is preferably a ½"–13 coupling, the rod is also preferably ½" in diameter. However, the precise length of the rod will vary depending on the needs of the user. Once the rod 22 is threadedly coupled to the coupling 35 of the support member 32, a wing nut 20 or other similar fastening device with a dimension of approximately ½"–13 can be utilized to ensure that the rod 22 is locked within the coupling 35. Although threaded engagements can ensure a secure fit between components, vibrational motion caused by tools attached to the fixture system may adversely effect the integrity of the interconnection. Accordingly, the use of wing nuts 20, or the like is preferred. It should be also appreciated many known equivalents to wing nuts 20 exist and can be employed with similar results.

The other end of the rod 22 is then threaded into the housing coupling 26 of the housing 24 to complete the first segment of the fixture system. Preferably, the housing coupling 26 has the same dimensions as the coupling 35 of the support member 32. Specifically, the housing coupling 26 is approximately ½"–13 and is welded or otherwise affixed to the channel 28. Once again, a wing nut 22 or other similar fastening device can be used to ensure a secure interconnection between the rod 22 and the housing coupling 26. After the rod 22 is secured within the housing coupling 26, a second support member 32' is secured within the channel 28 of the housing 24 in the same manner as described above with respect to the set of support brackets 12. Namely, the shaft 33' of the second support member 32' is positioned within the channel 28 of the housing 24, with the thru-hole 37 of the shaft 33' being aligned with the thru-hole 31 of the housing 24. Once aligned, a connector or handle 16 is inserted into the thru-hole 31 of the housing 24, through the thru-hole 37 of the shaft 33' and into the fastener or nut 30 affixed to the channel 24 of the housing 24. The thru-holes of both the housing 24 and the shaft 33' are preferably ½" in diameter while the fastener 30 is approximately a ½"–13 nut and is preferably welded to the channel 28. However, it should be appreciated that many other means of affixing the fastener 30 to the channel 28 exists.

The handle 16 can then be rotated to tighten or loosen the junction between the second support member 32' and the housing 24. In addition, similar to the support member 32 positioned within the set of support brackets 12, the second support member 321 in the housing 24 can be positioned at various positions along a rotation axis, thus, giving a user increased flexibility with respect to the positioning of the fixture system 10. Once the coupling 35' of the second support member 321 is in the desired position, the user can then add another segment to the fixture system 10. Specifically, as shown in FIG. 3B, a second rod 22', of approximately ⅜"–16, can be threaded into the ⅜–16 coupling 351 of the second support member 321 and then secured with a ⅜"–16 wing nut 20.

This second rod 22' is preferably threaded and, as shown in 3B, is threaded into a housing coupling 26' of a second housing 24'. Similar to the previous segment, the housing coupling 261 of the second housing 24' should have the same dimensions as the second threaded rod 22', namely ⅜"–16 so as to ensure a tight fit. In addition, another ⅜"–16 wing nut 20' can be utilized between the second rod 22' and the housing coupling 261 of the second housing 24' to further ensure a tight fit. Once the second rod 221 is threadedly secured within the housing coupling 26' of the second housing 24', a third support member 32" can be interconnected within the second housing 24', with the use of another handle or connector 16. Once again, the user will secure the support member by positioning the shaft 33" within the housing 24' so that the ½" thru holes 37 and 31 are in alignment. Then, the handle 16 will be passed through the shaft 33" and into the fastener or nut 30 affixed to the channel 28' of the second housing 24'. Preferably, the coupling of the third support member 32" is approximately ⅜"–16 while the fastener or nut affixed to the channel 28' is approximately ½"–13.

Finally, a third rod segment 22", is threadedly coupled to the coupling 35" of the third support member 32" and if desirable, is further secured with a wing nut 20'. Preferably, the third rod segment 22" and the wing nut 20" are approximately ⅜"–16 while the third rod segment 22" is about 6", in length and is bent at an angle. Once assembled, a user is then free to threadedly engage tools, or the like with the free end of the third rod 22". Examples of such tools, include, inter alia, screwdrivers, drills, clamps, or flashlights. It should be appreciated, however, that the third rod 22" need not be limited in size or bent at any angle.

It should also be appreciated that the number of segments in the fixture system and all dimensions given in this description are for illustrative and best mode purposes only and are not intended to be limiting. For example, a user could assemble a fixture system 10 having fewer or greater number of segments and/or where all components are of larger, smaller, or equivalent dimensions. In addition, all components are preferable comprised of a metal, such as carbon or stainless steel. However, it should be appreciated that many equivalents exist, such as hardened plastics. Moreover, FIG. 3B, and the description given thereof, depicts only one side/arm of the fixture system 10. However, it should be understood that complimentary components are used in assembling the other side(s)/arm(s) and segments of the system 10.

Figure 6A:
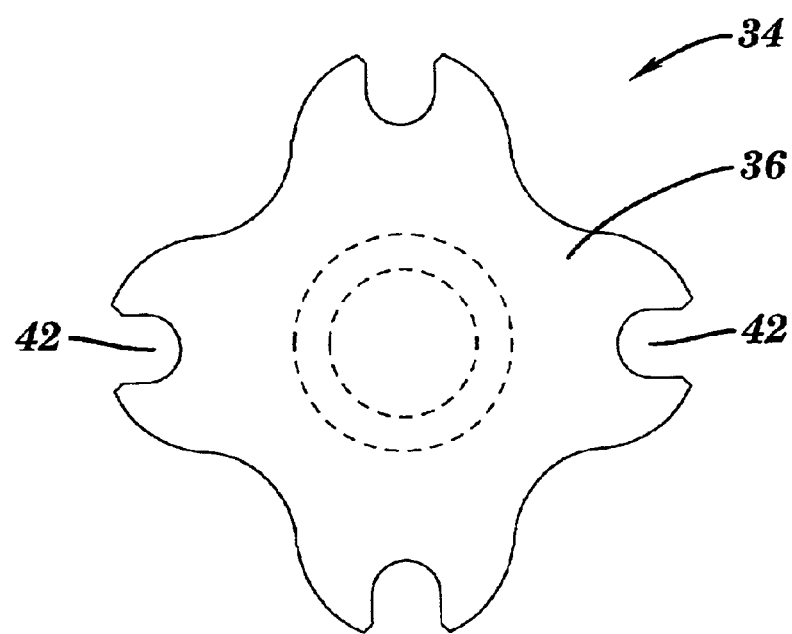
FIG. 6A is a front view of a base plate assembly, in accordance with the present invention.
Figure 6B:
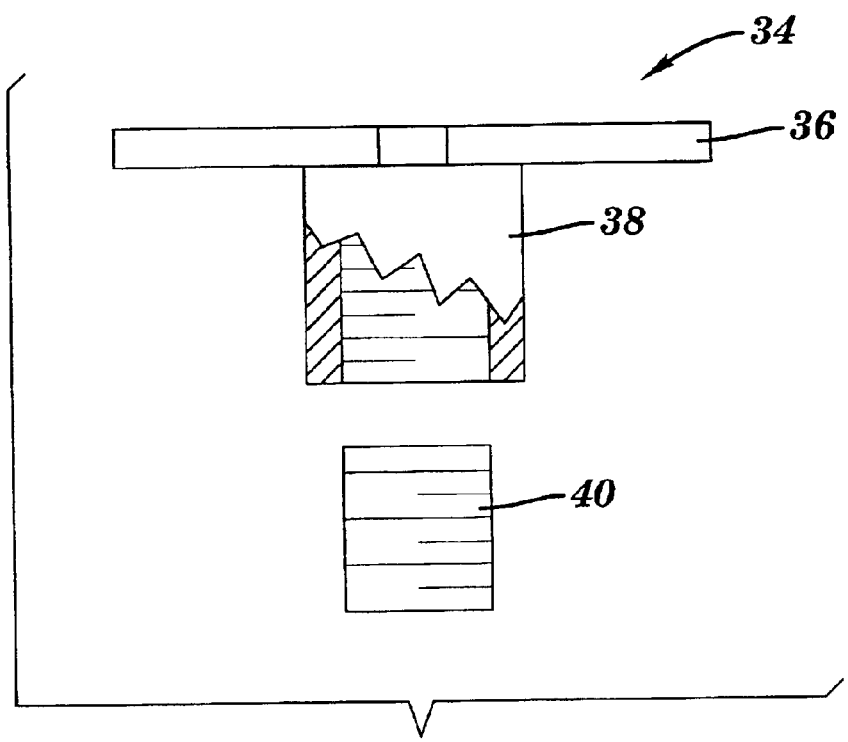
FIG. 6B is a top view of the base plate assembly of FIG. 6A, in accordance with the present invention.

Referring now to FIGS. 6A and 6B, a metal base plate assembly 34 is shown. Specifically, base plate assembly 34 includes base plate 36, base coupling 38, and nipple 40. Preferably, base plate 36 is approximately a ¼" carbon steel plate that is welded to the 1" base coupling 38. The nipple 40 is preferably a 1" threaded nipple that is threadedly coupled within the base coupling 38. Disposed on the top surface of the base plate 36 are mounting slots 42. Once again, it should be understood that the dimensions, materials, and means for affixing cited for these components are for best mode and illustrative purposes and it should be understood that many equivalent variations exist. For example, the base plate assembly 34 need not be metal and can be constructed with varying dimensions. In addition, the base coupling 38 need not be welded to the base plate 36.

Once base plate assembly 34 is constructed, it is threadedly coupled to the aperture 11 of base 14, as shown in FIGS. 1 and 2. This allows for a tool, such as a vice 100, to be mounted onto the base plate 36 through the mounting slots 42. The vice 100 will enable a user to secure a workpiece in a desired position while leaving his/her hands free to manipulate the fixture system 10, or the tools fixed thereto.

Figure 7:
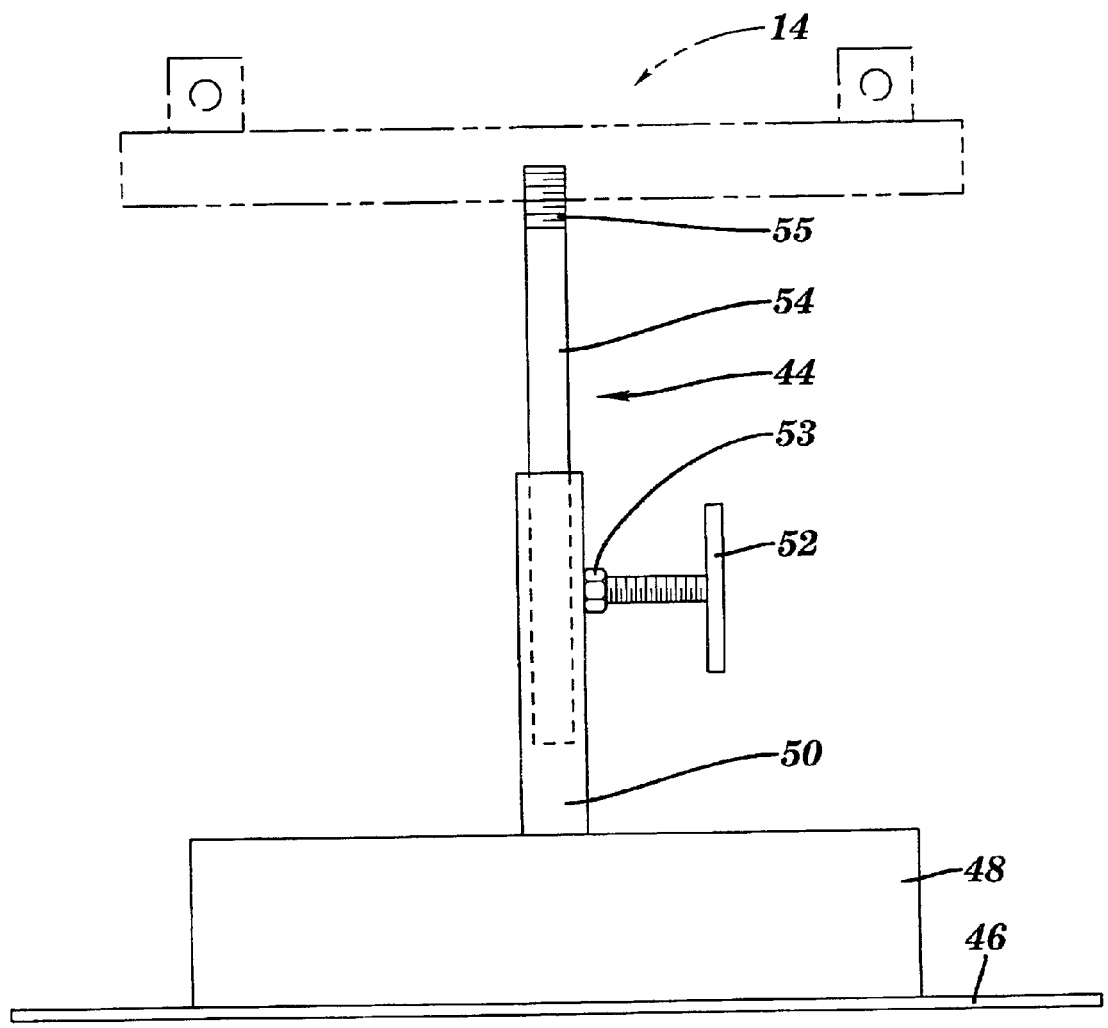
FIG. 7 is a front view of a stand, in accordance with the present invention.

FIG. 7 shows a stand 44 that is also adapted to coupled to the base 14. Specifically, the stand 44 includes a 24"×24"× ³⁄₁₆" steel mounting plate 46 that is welded to a 6" steel channel 48. Welded to the channel 48 is a 1¼" steel pipe 50 of optional length. Fitted into the steel pipe 50 is a 1" steel pipe 54, of optional length, having a 1" threaded nipple 40, that is approximately 2" in length, welded thereto. The overall lengths of the pipe segments 50 and 54 are optional depending on the needs of the user. In addition, the interconnection of the second pipe segment 54 within the first pipe segment 50 allows for the overall height of the stand to be adjusted. This adjustment is controlled with a connector or handle 52, which is inserted into an aperture 53 in the first pipe segment 50 and abutted against the second pipe segment. Thus, by rotating the handle 52, a user can lock the second pipe segment 54 into position within the first pipe segment 50 at any desired height.

Once the desired height of the stand 44 is achieved, the base 14 can then be mounted thereon. This is accomplished by threading the nipple 55 into the bottom side of the aperture 11 in the base 14. In cases where the base plate assembly 34 is also desired to be used, the presence of the stand will not interfere. In contrast, the base 14 is so designed such that both components can be threaded into the aperture 11, without interfering with one another. It should be appreciated that these specific dimensions and materials for the stand have been disclosed for best mode and illustrative purposes only. Accordingly, users may vary the materials used and the dimensions thereof equivalently.

FIGS. 8–11 show alternative bases that can be used in conjunction with the fixture system 10. Referring, first to FIGS. 8 and 9, a magnetic base 70 is shown. The magnetic base 70 generally includes footing 78 having support brackets 72 affixed thereto. Support brackets 72 preferable include a ½" thru-hole and a ½"–13 nut welded thereto while the footing 70 includes slots 80 and orifice 82. To affix a magnet 84 to the base, a user will insert the magnet 84 through the orifice 82 and bolt the magnet to the footing 78 through slots 80. Preferably, the magnetic base 70 is comprised of a metal, the slots 80 are ⅜", and the orifice is at a 60° angle. However, it should be understood that these characteristics have many known equivalents and are given for illustrative and best mode purposes only.

FIG. 9, shows the magnetic base in use. As can be seen, the base can have application where space is limited, and/or a metallic surface is present onto which the magnet base can be secured. To assemble the fixture system on the magnetic base 70, a user will follow the same steps set forth in assembling the fixture system 10 onto the base 14. Specifically, a support member 32 is inserted into the support brackets 72 and secured by positioning a handle 16 through thru-holes 74 and 37 and into fastener or nut 76.

Figure 11:
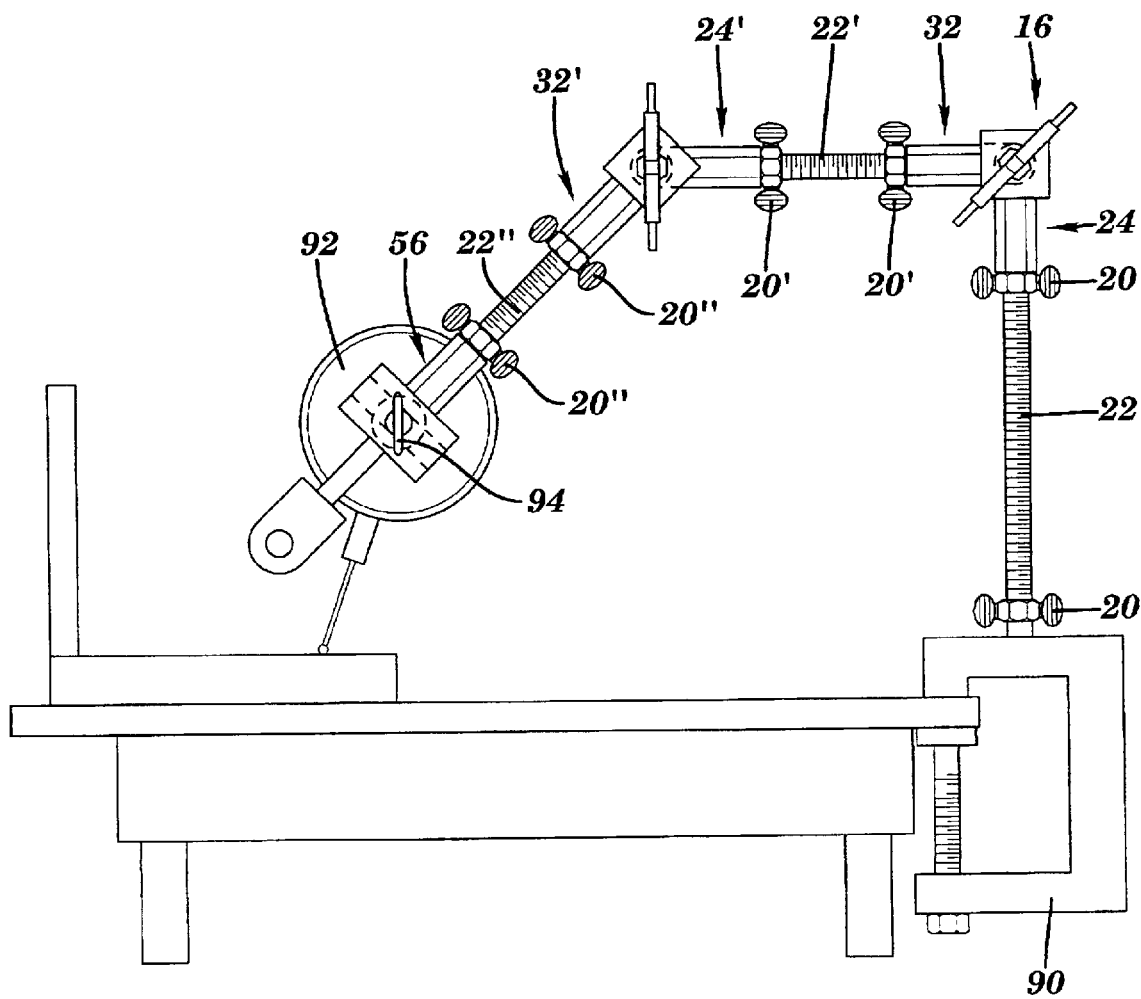
FIG. 11. is a front view of a fixture system having the dial indicator holder of FIG. 10, in accordance with the present invention.

FIG. 11 shows the fixture system 10 with a clamp 90 as a base. As shown, the clamp 90 can be any known clamp that has an aperture for threading. To assemble the fixture system 10, a user will affix the clamp 90 onto a desired surface and then thread a rod 22 into the aperture in the clamp 90. From there, a user can add wing nuts 20, 20', and 20", housings 24 and 24', couplings 32 and 32', and additional rod segments as desired.

Figure 10:
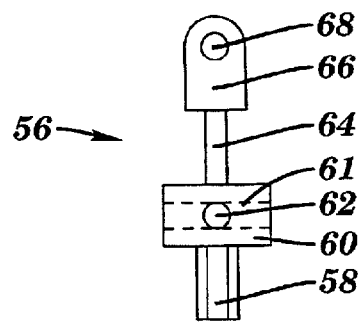
FIG. 10 is a front view of a dial indicator holder, in 1, accordance with the present invention.

Referring now to FIGS. 10 and 11, a dial indicator holder 56 is shown. Specifically, the dial indicator holder 56 is preferably attached to the outermost rod of the fixture system 10, as shown in FIG. 11, and allows a user to attach a dial indicator to the fixture system. The dial indicator holder 56 is generally comprised of a ⅜ tool coupling 58 welded to a shaft 60 that has a ⅜" diameter thru-hole 61 and a ¼"–20 tapped hole 62. Welded to the shaft 60 is an elongate support segment 64 that is welded to a tip 66 that has a ¼" diameter tapped hole.

To affix a dial indicator 92 to the dial indicator holder 56, a user will thread the rod 22" into the tool coupling 58 of the dial indicator holder 56 and, if desired, secured the connection with a wing nut 20", if desired. Once the holder 56 is firmly attached to the rod 22", the dial indicator 92 is secured onto the shaft 60 by placing a thumb screw 94, or other similar fastener, through the tapped hole 62 and into an aperture disposed along the back surface of the dial indicator 92. Once again, the precise materials and dimensions set forth are for illustrative and best mode purposes only, and it should be understood that many equivalents exist.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A fixture system comprising:
   a base having at least one set of support brackets;
   a first support member, adapted for connection to at least one of the support brackets, wherein the support member includes a shaft having a threaded coupling joined thereto;
   a first connector, extending through one of the set of support brackets and the shaft, for securing the support member to the one set of support brackets;
   a rod having a first end and a second end, wherein the first end is coupled to the coupling; and
   a housing including a housing coupling, wherein the second end of the rod is coupled within the housing coupling, and wherein the housing further includes a unshaped channel affixed to the housing coupling.

2. The system of claim 1, wherein the at least one set of support brackets is welded to the base.

3. The system of claim 1, wherein the at least one set of support brackets each include:
   a thru-hole; and
   a fastener, positioned proximate the thru-hole.

4. The system of claim 3, wherein the connector includes a pair of flared handles and a threaded portion for engaging the thru-hole of the one set of support brackets and threadedly securing to the fastener.

5. The system of claim 1, wherein the base includes a threaded aperture.

6. The system of claim 1, wherein the coupling is welded to the shaft.

7. The system of claim 1, wherein the rod is threaded.

8. The system of claim 1, wherein the housing further includes a metal u-shaped channel affixed to the housing coupling.

9. The system of claim 1, wherein the housing coupling is threaded and is welded to the channel.

10. The system of claim 1, further comprising means for securing the second end of the rod to the housing coupling.

11. The system of claim 1, further comprising a second support member coupled to the housing, wherein the second support member also includes a shaft having a coupling joined thereto.

12. A base, comprising:
   an elongate body having a first end and a second end;
   a first set of support brackets positioned adjacent the first end and a second set of support brackets positioned adjacent the second end, wherein each set of support brackets includes a thru-hole;
   a threaded aperture in the elongate body between the first and second ends; and
   a base plate assembly, wherein the base plate assembly includes:
     a base plate having a plurality of mounting slots for mounting a tool thereon;
     a base coupling affixed to the base plate; and
     a threaded segment for engaging a threaded aperture in the base.

* * * * *